(12) United States Patent
Baldiga et al.

(10) Patent No.: US 8,161,146 B2
(45) Date of Patent: Apr. 17, 2012

(54) METHOD, SYSTEM, AND PROGRAM PRODUCT FOR ASSIGNING DEVICE IDENTIFIERS

(75) Inventors: Frank P. Baldiga, Apex, NC (US); Micah M. Cross, Creedmoor, NC (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 10/634,261

(22) Filed: Aug. 5, 2003

(65) Prior Publication Data
US 2005/0044194 A1    Feb. 24, 2005

(51) Int. Cl.
*G06F 15/173* (2006.01)
(52) U.S. Cl. .................... 709/223; 709/226
(58) Field of Classification Search .............. 709/223, 709/226
See application file for complete search history.

(56) References Cited

U.S. PATENT DOCUMENTS

| | | | |
|---|---|---|---|
| 6,195,706 B1 * | 2/2001 | Scott | 709/245 |
| 6,263,437 B1 | 7/2001 | Liao et al. | |
| 6,360,276 B1 * | 3/2002 | Scott | 709/245 |
| 6,430,578 B1 | 8/2002 | Vuong et al. | |
| 6,463,473 B1 | 10/2002 | Gubbi | |
| 6,714,981 B1 * | 3/2004 | Skaggs et al. | 709/227 |
| 6,772,420 B1 * | 8/2004 | Poger et al. | 719/327 |
| 6,842,789 B1 * | 1/2005 | Nazari | 709/245 |
| 6,877,042 B2 * | 4/2005 | Tawil et al. | 709/250 |
| 7,096,273 B1 * | 8/2006 | Meier | 709/236 |
| 7,346,653 B2 * | 3/2008 | Matsui et al. | 709/203 |
| 7,356,574 B2 * | 4/2008 | Demmon | 709/219 |
| 7,398,310 B1 * | 7/2008 | Kuehl et al. | 709/224 |
| 7,451,224 B1 * | 11/2008 | Stamler | 709/228 |
| 7,650,402 B1 * | 1/2010 | Batz et al. | 709/224 |
| 2002/0032780 A1 | 3/2002 | Moore et al. | |
| 2002/0062485 A1 * | 5/2002 | Okano et al. | 725/111 |
| 2002/0080822 A1 | 6/2002 | Brown et al. | |
| 2002/0133573 A1 * | 9/2002 | Matsuda et al. | 709/220 |
| 2002/0156875 A1 | 10/2002 | Pabla | |
| 2003/0199265 A1 * | 10/2003 | Aoyama et al. | 455/406 |
| 2004/0122931 A1 * | 6/2004 | Rowland et al. | 709/223 |
| 2004/0199644 A1 * | 10/2004 | Gass et al. | 709/227 |
| 2005/0033833 A1 | 2/2005 | Baldiga et al. | |

OTHER PUBLICATIONS

Ralph Droms, RFC 2131: Dynamic Host Configuration Protocol, Mar. 1997, Network Working Group, p. 16-17 and 40.*

* cited by examiner

*Primary Examiner* — Firmin Backer
*Assistant Examiner* — Brian P. Whipple
(74) *Attorney, Agent, or Firm* — Jeffrey T. Holman

(57) ABSTRACT

Method, system, and program product for assigning device identifiers. A device requests a device identifier from a server. The server obtains the device identifier, marks a status of the device identifier as pending, and sends it to the device. The device sends an acknowledgment back to the server. The server then marks the status of the device identifier as in use and sends a confirmation to the device. The device starts to use the device identifier after receiving the confirmation.

16 Claims, 8 Drawing Sheets

| | ENTRY | DEV TYPE | USER | DEV ID | STATUS | TIMESTAMP |
|---|---|---|---|---|---|---|
| 52A | 1 | HANDHELD | SMITH | x0101 | IN USE | 37789.372 |
| 52B | 2 | LAPTOP | SMITH | x0201 | IN USE | 37793.620 |
| 52C | 3 | HANDHELD | JONES | x0102 | NOT USED | 0 |
| 52D | 4 | LAPTOP | JONES | x0202 | IN USE | 37795.334 |
| 52E | 5 | HANDHELD | NEWMAN | x0103 | PENDING | 37795.542 |
| 52F | 6 | LAPTOP | NEWMAN | x0203 | NOT USED | 0 |

Columns: 54, 56, 58, 60, 62, 64 / 50

FIG. 7

| | ENTRY | DEV TYPE | USER | DEV ID | STATUS | TIMESTAMP |
|---|---|---|---|---|---|---|
| 52A → | 1 | HANDHELD | SMITH | x0101 | IN USE | 37789.372 |
| 52B → | 2 | LAPTOP | SMITH | x0201 | IN USE | 37793.620 |
| 52C → | 3 | HANDHELD | JONES | x0102 | NOT USED | 0 |
| 52D → | 4 | LAPTOP | JONES | x0202 | IN USE | 37795.334 |
| 52E → | 5 | HANDHELD | NEWMAN | x0103 | PENDING | 37795.542 |
| 52F → | 6 | LAPTOP | NEWMAN | x0203 | NOT USED | 0 |

Column labels: 54, 56, 58, 60, 62, 64

50

METHOD, SYSTEM, AND PROGRAM PRODUCT FOR ASSIGNING DEVICE IDENTIFIERS

CROSS-REFERENCE TO CO-PENDING APPLICATION

This application is related in some aspects to a commonly owned U.S. patent application No. 10/634,260 entitled "Method, System and Program Product for Managing Device Identifiers," which is hereby incorporated by reference.

BACKGROUND OF THE INVENTION

1. Technical Field

The invention relates generally to assigning device identifiers over a network, and more specifically, to a robust solution for centrally assigning a device identifier and verifying that a device has received the assigned device identifier.

2. Related Art

Devices are increasingly sending messages between each other over computer networks. In typical messaging systems, a source computer sends a message to a destination computer, and the destination computer sends an acknowledgment back to the source computer. While this messaging scheme is sufficient for most messaging requirements, it poses problems when critical data is being transmitted in an unreliable messaging environment. For example, wireless devices are increasingly being used to access computer networks. Users seek to use diverse wireless devices such as handheld devices, mobile telephones, pagers, personal data assistants, etc. to access computer networks such as the Internet or a company network.

Many wireless devices do not have a readily accessible device identifier and/or other communications related information for use in communicating over a network. Further, device identifiers are often used to centrally manage devices. In this case, the device identifier cannot change for the physical device. As a result, changeable information such as a network address and/or a hostname often cannot be used. Assigning a device identifier to the wireless devices poses several problems. For example, the device identifier may be a long series of unrelated numbers and/or letters that are difficult for a user to correctly type in at the device. Alternatively, when the device identifier is generated by the device, it is difficult to ensure that the device identifier is unique. In either case, the server cannot manage the device before it initially connects to the network. As a result, it is desirable to generate device identifiers at a central location such as a server, and communicate a device identifier to a new device.

Unfortunately, managing device identifiers at a central location can require significant resources. Further, only a limited number of device identifiers are available for a network. As a result, it is important that a device identifier marked as being "used" at the central location is actually being used by the device. To date, communications with wireless devices remains highly unreliable. For example, wireless devices frequently lose their communication link or temporarily lose power. Further, messages are often lost due to noise in the wireless environment. For most types of messages, the fact that a message is missed is relatively unimportant. In a typical messaging system, the message transmission is merely retried after a certain timeout period. However, when the missed message includes an assigned device identifier, that device identifier may be improperly marked as "in use" even though it failed to be placed in actual use. As a result, numerous improperly marked device identifiers can accumulate over time. The unused device identifiers can degrade system performance and result in all device identifiers being prematurely marked as in use.

In light of this, a need exists for an improved solution for centrally assigning a device identifier to a device. In particular, a need exists for a method, system, and program product for assigning device identifiers from a server that increases the likelihood that a device is actually using the device identifier before it is marked as in use at the server.

SUMMARY OF THE INVENTION

The invention provides a robust method, system, and program product for centrally assigning a device identifier to a device. Specifically, under the present invention, a device requests a device identifier from a server. An unused device identifier is obtained, and its status is marked as pending. The device identifier is sent to the device, which sends an acknowledgment back to the server. After receiving the acknowledgment, the server marks the device identifier as "in use" and sends a confirmation back to the device. The device starts using the device identifier after receiving the confirmation. In one embodiment, a set of device entries is managed at the server. Each device entry includes a device identifier, a status, and correlation data that can include user data and device data. When the device initially requests the device identifier, the request includes correlation data for the device. The correlation data is used to find a matching device entry. Thus, the present invention provides an improved solution for assigning and/or managing device identifiers.

A first aspect of the invention provides a method for assigning a device identifier to a device, the method comprising: receiving a request for the device identifier at a server; obtaining the device identifier; marking a-status of the device identifier as pending; sending the device identifier to the device; marking the status of the device identifier as in use after receiving an acknowledgment from the device; and sending a confirmation to the device after the acknowledgment is received.

A second aspect of the invention provides a method of obtaining a device identifier for a device, the method comprising: sending a request for the device identifier to a server; sending an acknowledgment to the server after receiving the device identifier from the server; and using the device identifier after receiving a confirmation from the server.

A third aspect of the invention provides a system for assigning a device identifier to a device, the system comprising: an assignment system for managing an assignment of the device identifier at a server, wherein the assignment system obtains the device identifier in response to a request, marks a status of the device identifier as pending, and marks the status of the device identifier as in use in response to an acknowledgment of the device identifier from the device; and a server communication system for sending the device identifier to the device, sending a confirmation to the device after the acknowledgment is received, and for receiving the request and the acknowledgment from the device.

A fourth aspect of the invention provides a program product stored on a recordable medium for assigning device identifiers, which when executed comprises: program code for receiving a request for the device identifier at a server; program code for obtaining the device identifier; program code for marking a status of the device identifier as pending; program code for sending the device identifier to the device; program code for marking the status of the device identifier as in use after receiving an acknowledgment from the device;

and program code for sending a confirmation to the device after the acknowledgment is received.

BRIEF DESCRIPTION OF THE DRAWINGS

These and other features of this invention will be more readily understood from the following detailed description of the various aspects of the invention taken in conjunction with the accompanying drawings in which:

FIG. 7 shows an illustrative set of device entries according to another aspect of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The invention provides a robust method, system, and program product for centrally assigning a device identifier to a device. Specifically, under the present invention, a device requests a device identifier from a server. An unused device identifier is obtained, and its status is marked as pending. The device identifier is sent to the device, which sends an acknowledgment back to the server. After receiving the acknowledgment, the server marks the device identifier as "in use" and sends a confirmation back to the device. The device starts using the device identifier after receiving the confirmation. In one embodiment, a set of device entries is managed at the server. Each device entry includes a device identifier, a status, and correlation data that can include user data and device data. When the device initially requests the device identifier, the request includes correlation data for the device. The correlation data is used to find a matching device entry. Thus, the present invention provides an improved solution for assigning and/or managing device identifiers.

Figure 1:
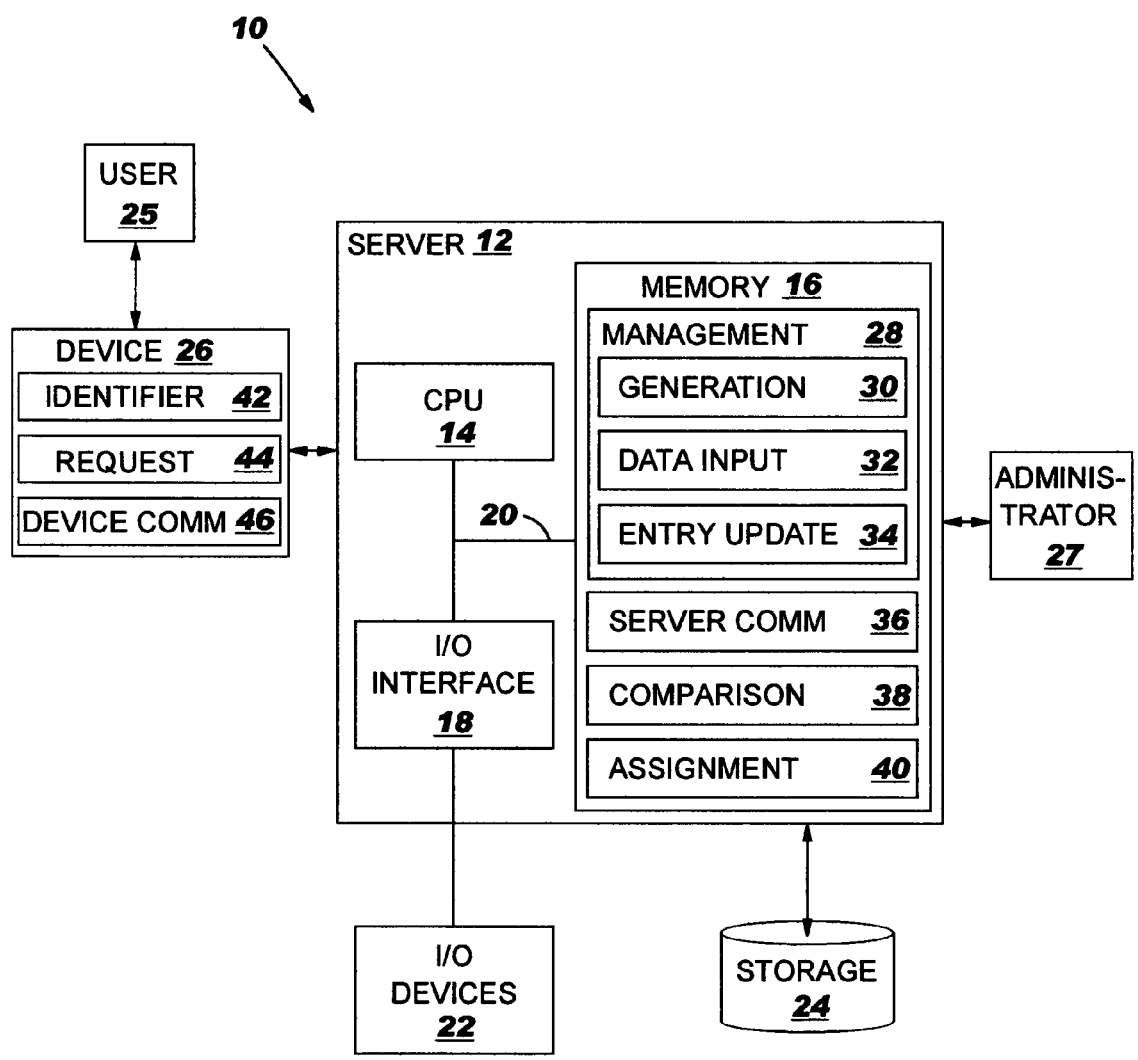
FIG. 1 shows an illustrative system according to one aspect of the invention.

Turning to the drawings, FIG. 1 shows an illustrative system 10 according to one embodiment of the invention. System 10 allows a unique device identifier to be centrally assigned to a device. As shown, system 10 includes a server 12 and a device 26, which communicate over a network. The network can comprise any type of network, including the Internet, a wide area network (WAN), a local area network (LAN), a virtual private network (VPN), etc. To this extent, communication can occur via a direct hardwired connection (e.g., serial port), or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, server 12 generally includes central processing unit (CPU) 14, memory 16, input/output (I/O) interface 18, bus 20, external I/O devices/resources 22, and a storage unit 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Storage unit 24 may comprise any type of data storage for providing more static storage of data used in the present invention. As such, storage unit 24 may include one or more storage devices, such as a magnetic disk drive or an optical disk drive. Moreover, similar to CPU 14, memory 16 and/or storage unit 24 may reside at a single physical location, comprising one or more types of data storage, or be distributed across a plurality of physical systems in various forms. Further, memory 16 and/or storage unit 24 can include data distributed across, for example, a LAN, WAN or a storage area network (SAN) (not shown).

I/O interface 18 may comprise any system for exchanging information to/from one or more I/O devices 22. I/O devices 22 may comprise any known type of external device, including speakers, a CRT, LED screen, handheld device, keyboard, mouse, voice recognition system, speech output system, printer, monitor/display, facsimile, pager, etc. Bus 20 provides a communication link between each of the components in server 12 and likewise may comprise any known type of transmission link, including electrical, optical, wireless, etc. In addition, although not shown, additional components, such as cache memory, communication systems, system software, etc., may be incorporated into server 12.

Further, it is understood that device 26 can comprise any type of computing device capable of communicating with one or more other computing devices (e.g., server 12). For example, device 26 can comprise a server, a desktop computer, a laptop, a handheld device, a mobile phone, a pager, a personal data assistant, etc. To this extent, device 26 typically includes the same elements as shown in server 12 (e.g., CPU, memory, I/O interface, etc.). These have not been separately shown and discussed for brevity. It is understood, however, that if device 26 is a handheld device or the like, the display would be contained within device 26, and not as an external I/O device 22 as shown for server 12.

A user 25 interacts with system 10 by interacting with device 26. For example, user 25 may be requested to provide a user name and/or password to access server 12. User 25 would provide this information to system 10 using device 26. Further, an administrator 27 may also interact with system 10. Administrator 27 may communicate directly with server 12 (e.g., using one or more I/O devices 22) or use a device similar to device 26. Administrator 27 typically monitors and/or manages the operation of system 10. For example, administrator 27 could enter user and/or device data into system 10 for a new user 25.

Shown in memory 16 is a management system 28 that includes a generation system 30, a data input system 32, and an entry update system 34. Also shown in memory 16 are a server communication system 36, a comparison system 38, and an assignment system 40. While various systems are shown implemented as part of management system 28, it is understood that some or all of the systems can be implemented independently, combined, and/or stored in memory for one or more separate servers 12 that communicate over a network. Further, device 26 is shown as including an identifier system 42, a request system 44, and a device communication system 46. Operation of the various systems will be described below.

Figure 2:
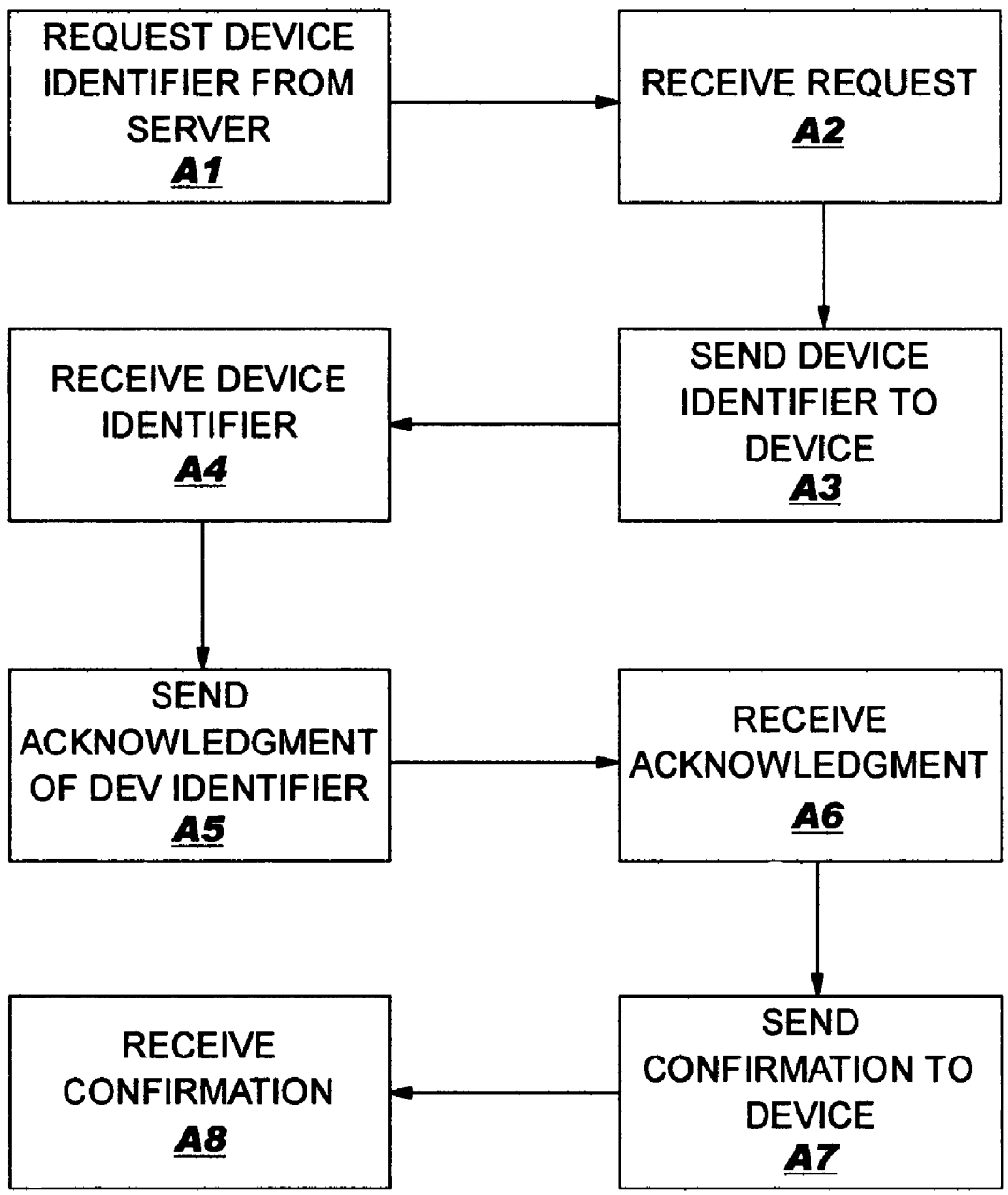
FIG. 2 shows illustrative steps used to assign a device identifier according to one aspect of the invention.

In general, assignment system 40 manages the assignment of a device identifier to device 26 on server 12, while request system 44 manages the obtaining of the device identifier on device 26. To this extent, assignment system 40 and request system 44 process and generate several messages that are sent and received by server communication system 36 and device communication system 46, respectively, to assign the device identifier to device 26. FIG. 2 shows illustrative steps performed in processing messages communicated between device 26 and server 12 to centrally assign a device identifier to device 12. In step A1, the device generates a request for a device identifier using request system 44 (FIG. 1), and sends the request to server 12 using device communication system 46 (FIG. 1). In step A2, server communication system 36 (FIG. 1) receives the request, and forwards it to assignment system 40 (FIG. 1), which obtains an unused device identifier. In step A3, assignment system 40 generates a message to send the device identifier to device 26, and server communication system 36 sends the message to device 26. In step A4, device communication system 46 receives the device identifier and forwards it to request system 44. In step A5, request system 44 generates an acknowledgment that the device identifier was received, which is sent to the server by device communication system 46. In step A6, server communication system 36 receives the acknowledgment, and forwards it to assignment system 40. In step A7, assignment system 40 generates a confirmation message that is sent back to device 26 using server communication system 36. In step A8, device communication system 46 receives the confirmation and forwards it to request system 44. At this point, device 26 can start using the device identifier. As a result, request system 44 forwards the device identifier to identifier system 42, which uses the device identifier for all subsequent communications.

In order to identify device 26 without a device identifier, correlation data can be included with each message used in assigning the device identifier (i.e., request, device identifier, acknowledgment, and confirmation). For example, device 26 can include correlation data in the initial request for a device identifier (i.e., since the device has not yet been assigned a device identifier). Correlation data typically includes device data and user data. Device data could include any combination of a device type, a serial number, etc. that will identify a particular device. The device data (e.g., device type) can be input by the user, automatically detected by the device, or a combination thereof. Similarly, user data could include any combination of a user name, a password, a personal identification number, a passkey, etc. that will identify a particular user.

Continuing with FIG. 1, in order to track the progress of the device identifier assignment operation, assignment system 40 and/or request system 44 can further manage a "status" of the device identifier. For example, after assignment system 40 obtains an unused device identifier, the status of the identifier can be marked as "pending." Once the identifier is communicated to device 26, and an acknowledgment is received therefrom, the status can be marked as "in use." In one embodiment, one or more device identifiers may be created before the initial request is received from device 26. In this case, assignment system 40 could obtain a device identifier having a status of "unused," and assign this identifier to device 26. Similarly, after receiving the device identifier, request system 44 of device 26 can mark the status of the device identifier as "pending." Once the confirmation is received from server 12, the device identifier can then be marked as "in use."

In unreliable communication environments (e.g., wireless), one or more of the messages are frequently not received by server 12 or device 26. As a result, one or more time out periods can be used by request system 44 and/or assignment system 40 for receiving a message from server 12 or device 26, respectively. For example, device 26 may lose power and/or a communication link with server 12 while still in the process of being assigned the device identifier. As a result, the status would always indicate that the device identifier is "pending." To prevent this, assignment system 40 can periodically review all pending device identifiers, and can set the status to "unused" for device identifiers that have been waiting for a message for longer than the time out period. This enables these device identifiers to be reused after a certain period of time (e.g., one hour). On device 26, request system 44 can resend the request or acknowledgment after a time out period has elapsed (e.g., ten seconds). Server 12 can use a longer time out period than device 26 to allow device 26 time to recover from communication disabling events (e.g., bad cell or low battery) before giving up on receiving a message.

Returning to FIG. 2, any of the four messages sent in steps A1, A3, A5, and A7 may be missed by device 26 or server 12. As a result, both request system 44 (FIG. 1) and assignment system 40 (FIG. 1) should include functionality to address each of these situations. For example, server communication system 36 may never receive the request from device 26. In this case, assignment system 40 is unaware of the request, and request system 44 can resend the request after waiting a time out period. A predetermined number of retries may be used before request system 44 fails, and provides an error message to user 25 that server 12 is not available. Various other scenarios involving a missed message are discussed with reference to FIGS. 3-6. It is understood that, as in FIG. 2, the various steps performed on server 12 can be implemented by assignment system 40 or server communication system 36, and the various steps performed on device 26 can be implemented by request system 44 or device communication system 46.

Figure 3:
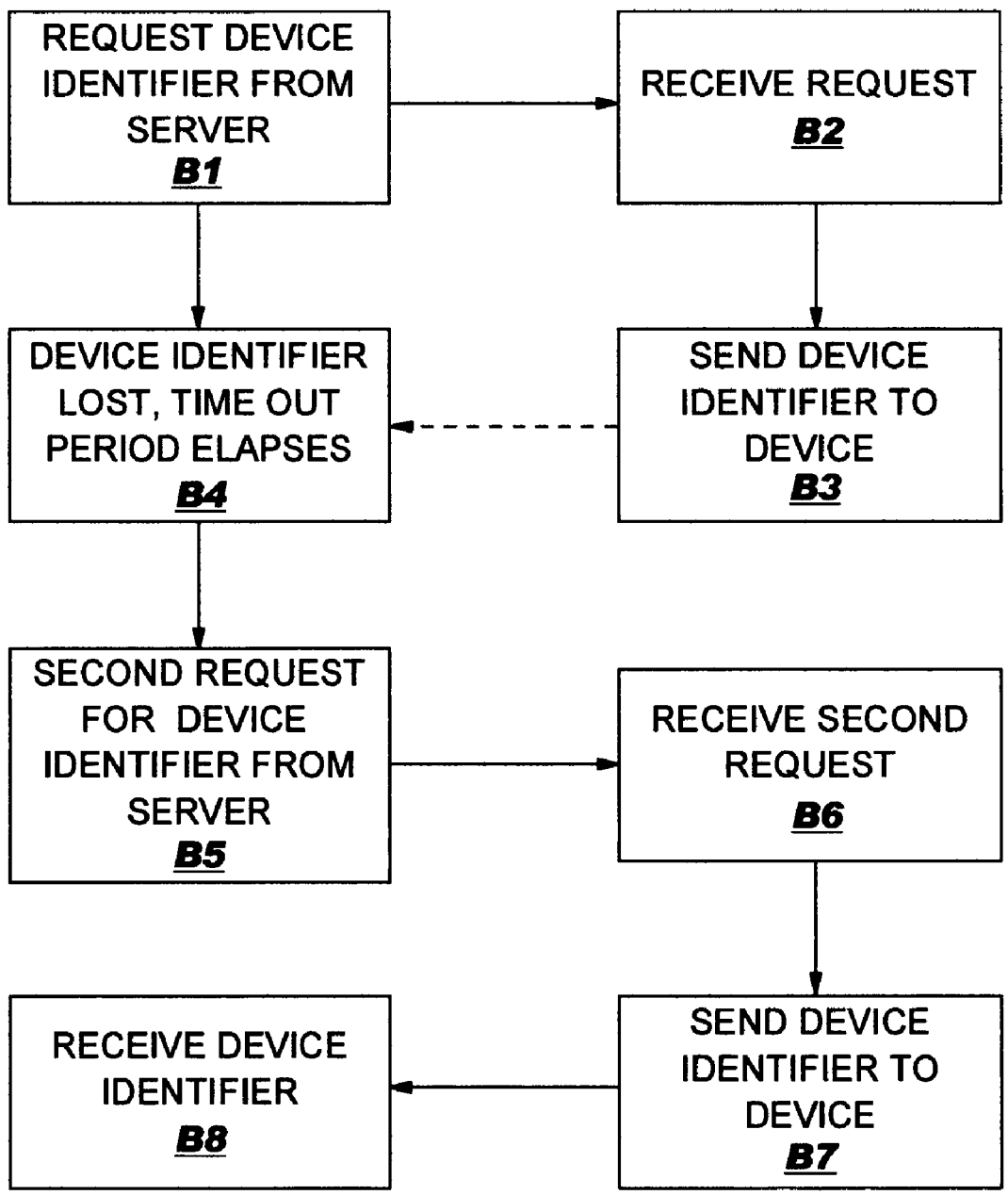
FIG. 3 shows illustrative steps used to assign a device identifier according to a second aspect of the invention.

FIG. 3 shows a message sequence in which device 26 never receives the device identifier from server 12. In step B1, device 26 requests a device identifier from server 12. In step B2, server 12 receives the request and obtains a device identifier. In step B3, server 12 sends the device identifier to device 26. However, in step B4, the device identifier message is missed by device 26, and device 26 detects that a time out period has elapsed. Since device 26 does not know if server 12 received the request, device 26 sends a second request for a device identifier to server 12 in step B5.

In step B6, server 12 receives the second request. By analyzing the correlation data for device 26, server 12 may recognize that a pending device identifier was previously sent to device 26. In this case, server 12 can resend the pending device identifier to device 26 in step B7. Alternatively, server 12 may assume that the request came from a different device. In this case, server 12 will obtain another unused device identifier, and send it to device 26 in step B7. If no unused device identifier is available, server 12 can look at all pending device identifiers to determine if any have been waiting for a message for a time period that is longer than the time out period. If a device identifier has been pending for longer than the time out period, server 12 can send the device identifier to device 26 in step B7 and reset the correlation data and time out period for the device identifier. In any event, device 26 receives the device identifier in step B8, and the processing continues as in steps A5-A8 discussed in FIG. 2.

Figure 4:
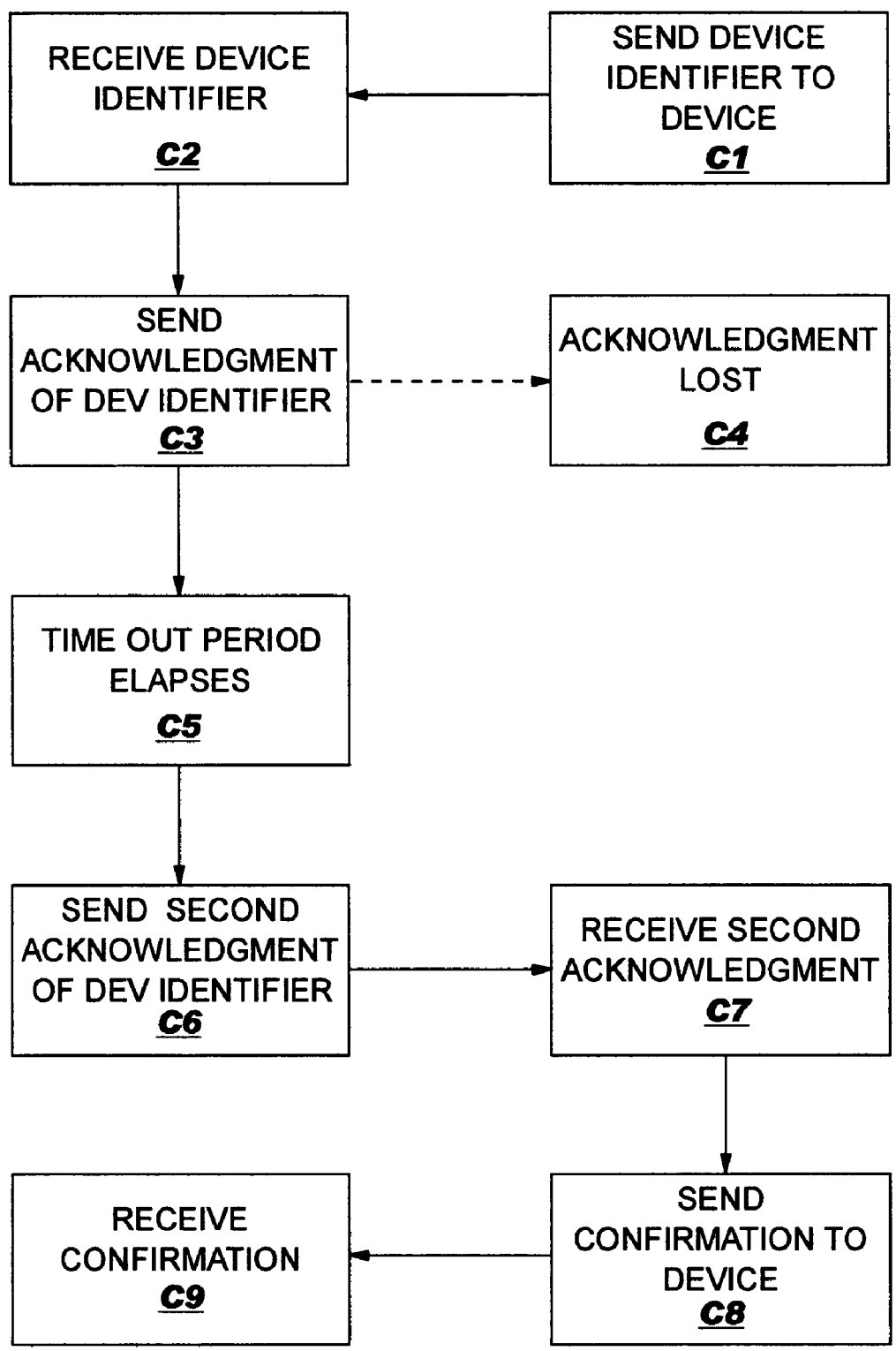
FIG. 4 shows illustrative steps used to assign a device identifier according to a third aspect of the invention.

FIG. 4 shows an illustrative message sequence in which server 12 never receives the acknowledgment from device 26. After having determined a device identifier for device 26, server 12 sends the device identifier to device 26 in step C1. In step C2, device 26 receives the device identifier, and in step C3, device 26 sends an acknowledgment of the device identifier to server 12. However, as indicated by step C4, the acknowledgment is lost, and never received by server 12. In step C5, device 26 recognizes that a time out period has elapsed. As a result, in step C6, device 26 sends a second acknowledgment to server 12, and server 12 receives the second acknowledgment in step C7. Two possibilities exist at this point. First, server 12 may continue to have the device identifier marked as "pending." In this case, server 12 sends the confirmation to device 26 in step C8, and device 26 receives the confirmation in step C9.

Figure 5:
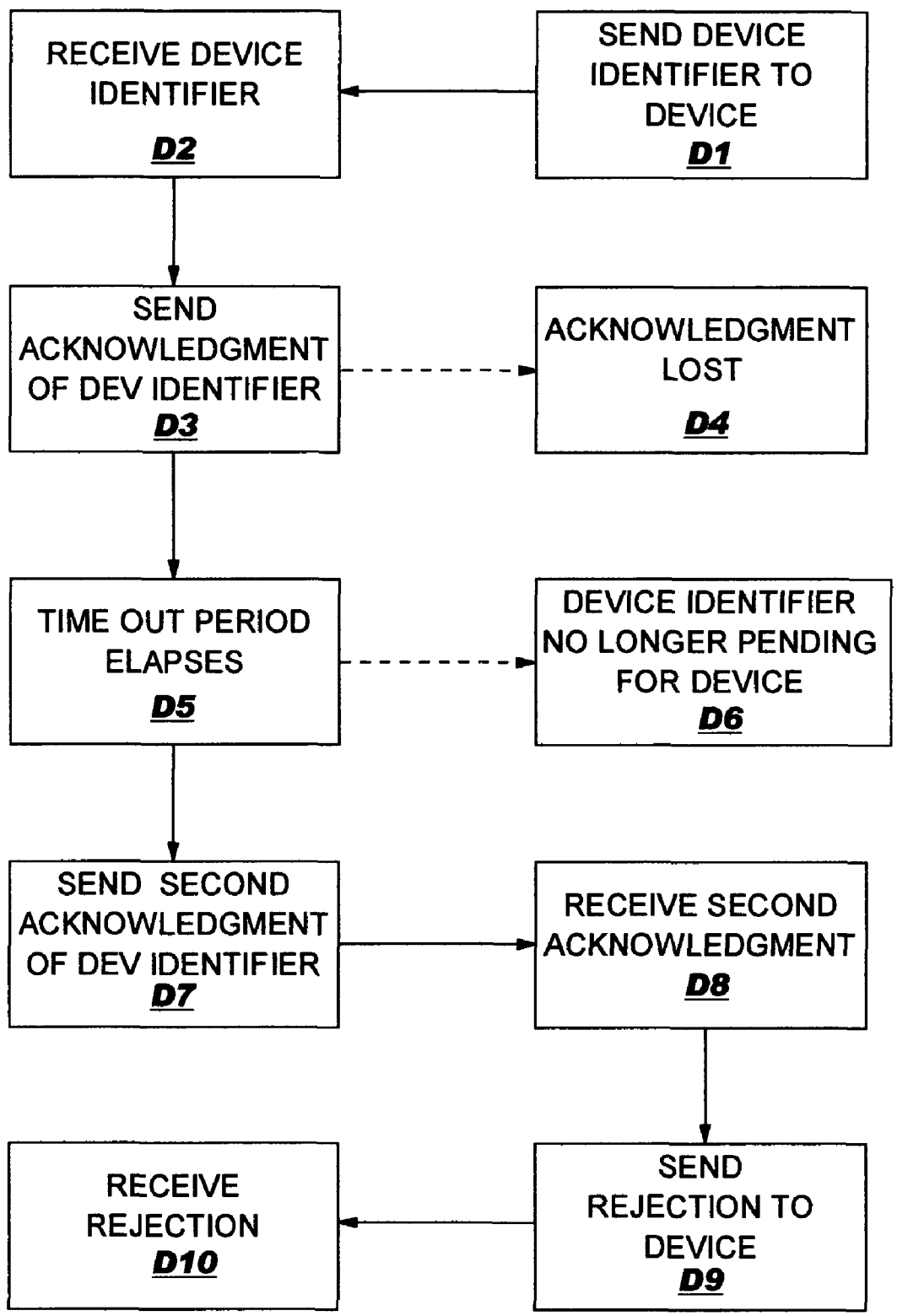
FIG. 5 shows illustrative steps used to assign a device identifier according to a fourth aspect of the invention.

In the second possibility, server 12 no longer has the device identifier marked as "pending." FIG. 5 shows illustrative steps that occur in this situation. As shown, steps D1-D5 are the same as steps C1-C5 discussed above with reference to FIG. 4. However, in step D6, the device identifier is no longer marked as "pending" for device 26. For example, server 12 may have recognized that the time out period had expired and set the device identifier status to "unused." Alternatively, server 12 may have used the device identifier when processing a request from a second device (e.g., when no unused device identifiers were available). In either case, device 26 sends a second acknowledgment of the device identifier in step D7, which is received by server 12 in step D8. When the second acknowledgment is received, the status may indicate that the device identifier is "not used" (e.g., server 12 set the status to unused after a time out period). Alternatively, the status may be "pending" or "in use," however the correlation data would not match the correlation data in the acknowledgment (e.g., server 12 reused the device identifier for a second device). In either case, server 12 generates and sends a rejection to device 26 in step D9. In step D10, device 26 receives the rejection. In order to obtain a device identifier, device 26 must restart the process by sending a request to server 12.

Figure 6:
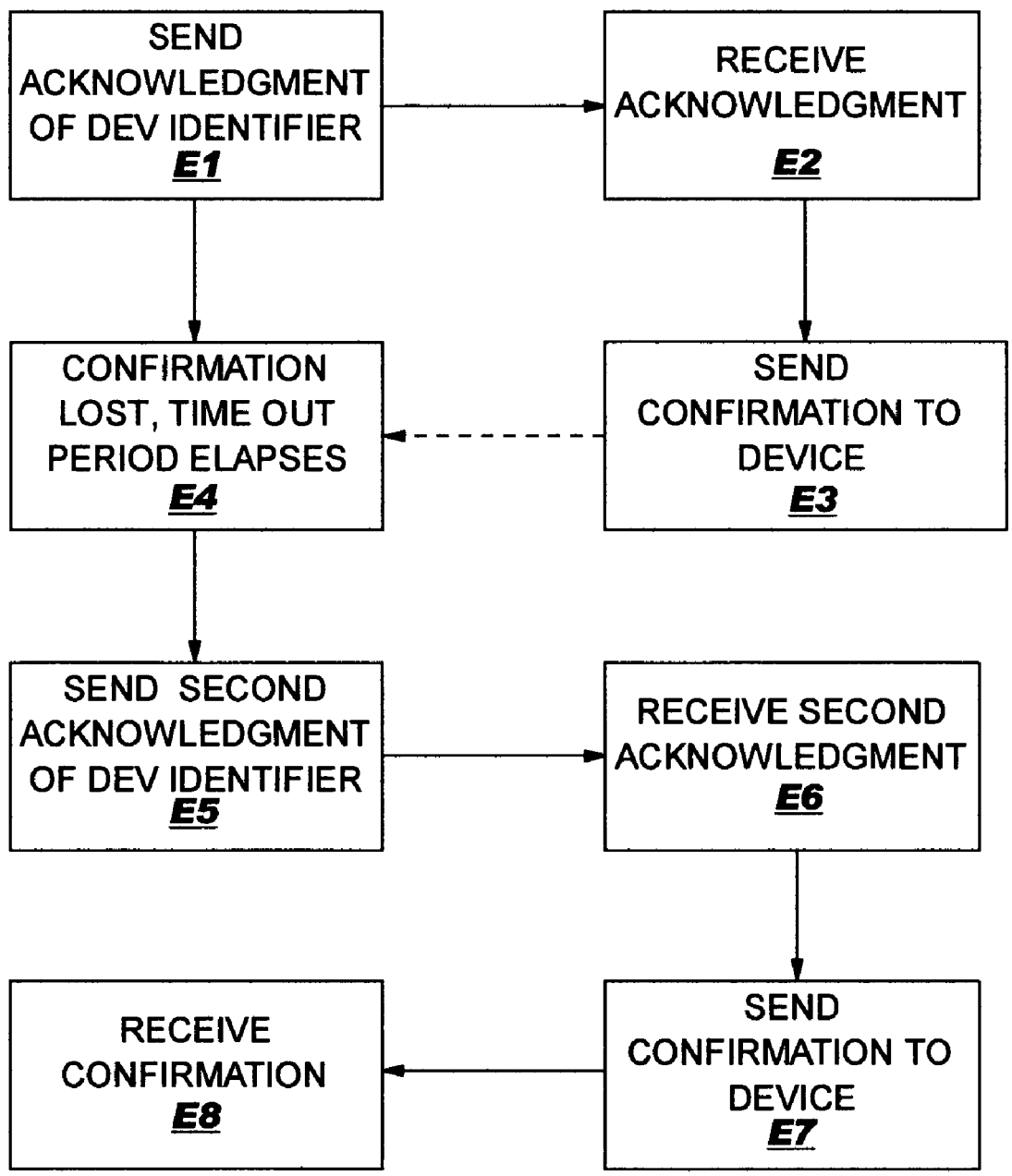
FIG. 6 shows illustrative steps used to assign a device identifier according to a fifth aspect of the invention.

FIG. 6 shows an illustrative message sequence in which device 26 never receives the confirmation from server 12. After having received a device identifier, device 26 sends an acknowledgment of the device identifier to server 12 in step E1. In step E2, server 12 receives the acknowledgment, and in step E3, server 12 sends a confirmation to device 26. However, in step E4, the confirmation is lost, and device 26 detects that a time out period has elapsed. At this point, server 12 has marked the device identifier as being "in use," but device 26 has not started using the device identifier. However, device 26 cannot start using the device identifier since it does not know if server 12 ever received the acknowledgment (as discussed in FIGS. 4 and 5). As a result, in step E5, device 26 sends a second acknowledgment, which is received by server 12 in step E6. Server 12 will have already marked the device identifier as being "in use." However, the correlation data will match the correlation data for device 26. As a result, in step E7, server 12 resends the confirmation to device 26, which is received by device 26 in step E8. Now device 26 can start using the device identifier.

Returning to FIG. 1, a management system 28 can be provided that manages a set (e.g., zero or more) of device entries. FIG. 7 shows an illustrative set of device entries 50. Set of device entries 50 includes device entries 52A-F. Set of device entries 50 can be stored in, for example, storage unit 24 (FIG. 1). To this extent, entry identifier 54 can be included to provide a unique key for each device entry 52A-F. As shown, each device entry 52A-F includes a device identifier 60 and correlation data such as device type 56 and user 58. It is understood that this is only illustrative of possible correlation data. Generation system 30 (FIG. 1) generates a unique device identifier 60 for each device entry 52A-F. Generation system 30 can automatically generate the unique device identifiers 60, or the unique device identifiers 60 can be selected by, for example, administrator 27 (FIG. 1). In the latter case, generation system 30 can perform a check to ensure that a selected device identifier 60 is unique. In a typical embodiment, device identifiers 60 are generated when each device entry 52A-F is created. In this case, device identifiers 60 could themselves be a unique key, and entry identifier 54 would not be required. However, including both device identifier 60 and entry identifier 54 provides additional flexibility. For example, when a device entry 52A-F is created, device identifier 60 could have a value indicating that it has not been generated (e.g., zero). In this case, device identifier 60 would not have a unique value generated until it is requested. Further, each device entry 52A-F is shown including a status 62 and a timestamp 64 to provide the corresponding functionality discussed above. When timestamp 64 is included in device entries 52A-F, timestamp 64 can also be included as correlation data. Alternatively, timestamp 64 can be included when the device identifier is sent to the device. Further, the device can include the timestamp in its acknowledgment. In either case, the inclusion of timestamp 64 allows the server to compare the timestamp in a message with timestamp 64 to further ensure that the correct device is identified.

In one embodiment, administrator 27 (FIG. 1) can use data input system 32 (FIG. 1) to enter correlation data. Data input system 32 can then provide the correlation information to entry update system 34 (FIG. 1) to create device entries 52A-F. For example, administrator 27 may enter user data for a new user named "Smith." Administrator 27 can further select/input various device types 56 that Smith can use to access server 12 (e.g., handheld and laptop). Once this information is input, a device entry 52A-B for each device type for Smith can be created. Alternatively, entry update system 34 could automatically create an entry for Smith for all the possible device types. Similarly, entries 52C-D are shown for a user named "Jones," and entries 52E-F are shown for a user named "Newman."

Figure 8:
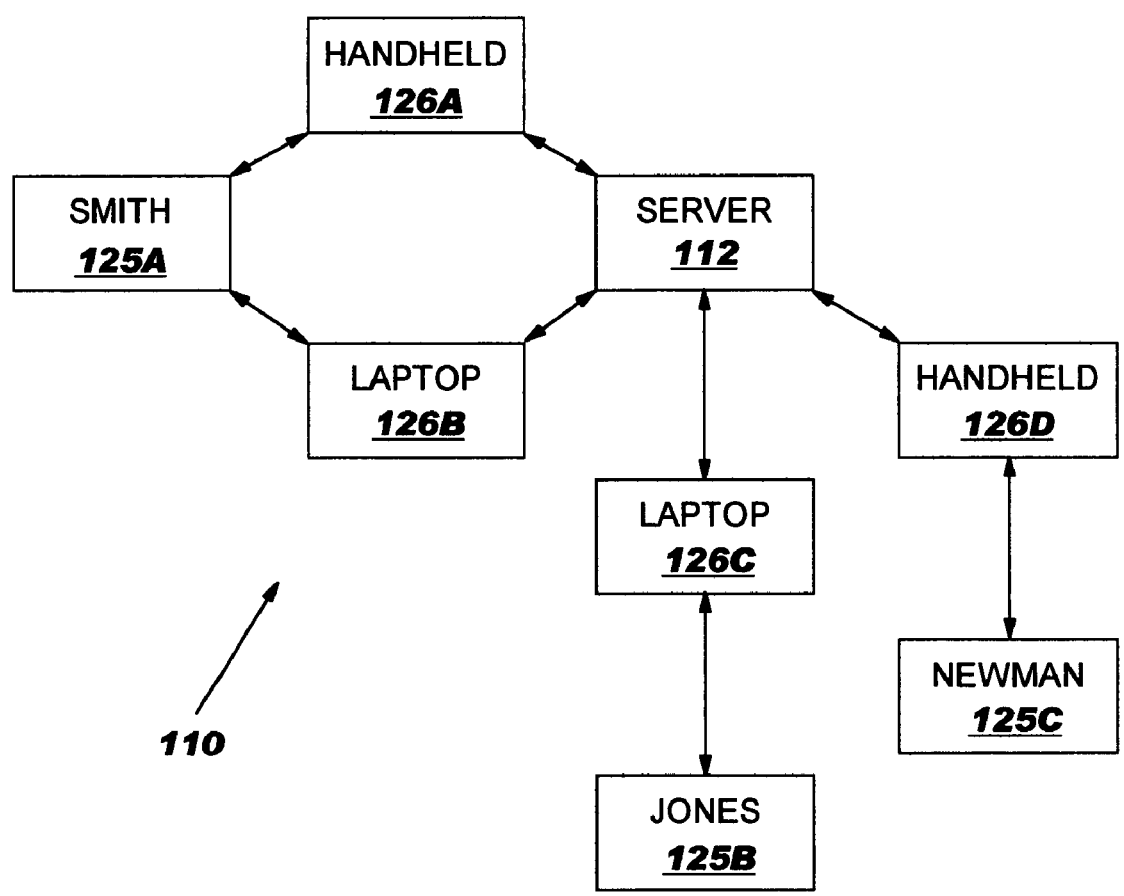
FIG. 8 shows an illustrative system according to yet another aspect of the invention.

FIG. 8 shows an illustrative embodiment of a system 110 that could correspond to the set of device entries 50 shown in FIG. 7. As shown, users 125A-C can interact with one or more devices 126A-D to communicate with server 112. In order to efficiently communicate with server 112, each device 126A-D is assigned a unique device identifier that is then used when messages are sent between server 112 and a particular device 126A-D. As discussed above, assignment system 40 (FIG. 1) is used to manage the assignment of device identifiers to devices 126A-D.

Assignment system 40 can forward correlation data received in a device message to comparison system 38 (FIG. 1). Comparison system 38 obtains a device entry 52A-F (FIG. 7) that corresponds to the device by using the correlation data. For example, comparison system 38 can compare the correlation data in the message to the correlation data in device entries 52A-F to determine if a device entry 52A-F matches the received correlation data. If no matching device entry 52A-F is found, comparison system 38 can generate an error message that is sent to device 126A by communication system 36. Alternatively, comparison system 38 can forward the correlation data to entry update system 34 (FIG. 1), which generates a device entry based on the received correlation data. Entry update system 34 can have generation system 30 (FIG. 1) generate a unique device identifier for the generated device entry. Comparison system 38 can then forward the device entry to assignment system 40 for processing.

Numerous benefits are obtained by the present invention as will be recognized by one skilled in the art. For example, the server will not have a significant amount of device identifiers improperly marked as in use. Further, while being assigned a device identifier, the device is responsible for all communication retries. As a result, the server does not need to include functionality that automatically retries messages for an unreliable device. Still further, a user is not required to enter an arbitrary, often long device identifier, and the generated device identifiers will be unique since they are all generated at the server.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for assigning a device identifier to a device, the method comprising:
receiving a request at a server from the device for the device identifier, wherein the request is accompanied by correlation data with unique identification information associated with the device;
obtaining the device identifier, the device identifier being unique from device identifiers of other devices identified by the server and distinct from a network address of the device, wherein the device identifier is obtained at the server and associated by the server with the correlation data from the device in response to the request from the device;
marking a status of the device identifier as pending;
sending the device identifier to the device, wherein the device identifier is accompanied by the correlation data associated with the device;
marking the status of the device identifier as in use after receiving an acknowledgment from the device, wherein the acknowledgment is accompanied by the correlation data associated with the device; and
sending a confirmation to the device after the acknowledgment is received, wherein the confirmation is accompanied by the correlation data associated with the device.

2. The method of claim 1, further comprising:
receiving a second acknowledgment from the device; and
sending a second confirmation to the device.

3. The method of claim 1, further comprising managing a set of device entries at the server, wherein each of the device entries comprises a unique device identifier, a status indicator to indicate a status of the corresponding device identifier, and correlation data associated with the corresponding device identifier.

4. The method of claim 3, wherein the correlation data comprises:
device data to particularly identify the corresponding device; and
user data to identify a particular user of the corresponding device.

5. The method of claim 3, wherein each of the device entries further includes a timestamp, the method further comprising setting the timestamp when the status is marked as pending.

6. The method of claim 1, wherein obtaining the device identifier comprises:
generating the device identifier before the request from the device is received at the server;
marking the status of the device identifier as unused; and
locating the device identifier having the status marked as unused after the request is received.

7. The method of claim 1, wherein obtaining the device identifier comprises generating the device identifier after receiving the request.

8. The method of claim 1, further comprising marking the status of the device identifier as unused if the acknowledgment is not received after a time out period.

9. The method of claim 1, further comprising:
reusing the device identifier for another request received from another device after a time out period has elapsed; and
sending a rejection to the device if the acknowledgment is received after the time out period has elapsed.

10. The method of claim 1, wherein a value of the device identifier prior to the request is indicative of an unused status of the device identifier.

11. A system for assigning a device identifier to a device, the system comprising:
an assignment system for managing an assignment of the device identifier at a server, wherein at least a portion of the assignment system is implemented by instructions stored on a data storage device, wherein the assignment system is configured to:
obtain the device identifier in response to a request, the device identifier being unique from device identifiers of other devices identified by the server and distinct from a network address of the device,
mark a status of the device identifier as pending, and
mark the status of the device identifier as in use in response to an acknowledgment of the device identifier from the device; and
a server communication system configured to:
receive the request from the device, wherein the request is accompanied by correlation data with unique identification information associated with the device,
send the device identifier to the device, wherein the device identifier is accompanied by the correlation data associated with the device, send a confirmation to the device after the acknowledgment is received,
wherein the acknowledgment is accompanied by the correlation data associated with the device, and
receive the acknowledgment from the device, wherein the confirmation is accompanied by the correlation data associated with the device.

12. The system of claim 11, further comprising:
a request system for obtaining the device identifier from the server, wherein the request system generates the request and the acknowledgment;
a device communication system for sending the request and the acknowledgment to the server, and for receiving the device identifier and the confirmation from the server; and
an identifier system that uses the device identifier after the confirmation is received.

13. The system of claim 11, further comprising:
a management system for managing a set of device entries, wherein each of the device entries comprises a unique device identifier, a status indicator to indicate a status of the corresponding device identifier, and correlation data associated with the corresponding device identifier; and
a comparison system for obtaining one of the device entries based on correlation data for the device.

14. A computer program product for assigning device identifiers, the computer program product comprising a non-transitory computer useable storage medium to store a computer readable program that, when executed on a processor within a computer, causes the computer to perform operations comprising:
receiving a request for the device identifier at a server, wherein the request is accompanied by correlation data with unique identification information associated with a device;
obtaining the device identifier, the device identifier being unique from device identifiers of other devices identified by the server and distinct from a network address of the device;
marking a status of the device identifier as pending;
sending the device identifier to the device, wherein the device identifier is accompanied by the correlation data associated with the device;
marking the status of the device identifier as in use after receiving an acknowledgment from the device, wherein the acknowledgment is accompanied by the correlation data associated with the device; and
sending a confirmation to the device after the acknowledgment is received, wherein the confirmation is accompanied by the correlation data associated with the device.

15. The program product of claim 14, further comprising:
sending the request to the server;
sending the acknowledgment to the server after receiving the device identifier from the server; and
using the device identifier after receiving the confirmation from the server.

16. The program product of claim 14, further comprising:
reusing the device identifier for another request received from another device after a time out period has elapsed; and
sending a rejection to the device if the acknowledgment is received after the time out period has elapsed.

* * * * *